United States Patent [19]
Beckley

[11] Patent Number: 5,441,123
[45] Date of Patent: Aug. 15, 1995

[54] SEALED LEAD-ACID CELL TRAY ASSEMBLY AND MOTIVE POWERED VEHICLE USING SUCH CELL TRAY ASSEMBLY

[75] Inventor: Gordon C. Beckley, Carol Stream, Ill.

[73] Assignee: GNB Battery Technologies Inc., Lombard, Ill.

[21] Appl. No.: 389,558

[22] Filed: Feb. 15, 1995

Related U.S. Application Data

[63] Continuation of Ser. No. 41,687, Apr. 1, 1993, abandoned.

[51] Int. Cl.⁶ .............................................. B60R 16/04
[52] U.S. Cl. ..................................... 180/68.5; 429/99; 429/100
[58] Field of Search ............... 180/68.5, 65.1, 65.3; 105/51; 429/99, 100; 29/730; 224/902

[56] References Cited

U.S. PATENT DOCUMENTS

| | | |
|---|---|---|
| 2,132,793 | 10/1938 | Kyle . |
| 2,548,558 | 4/1951 | Raney . |
| 2,942,058 | 6/1960 | Herold ................... 429/99 |
| 3,708,028 | 1/1973 | Hafer ................... 180/68.5 |
| 3,989,544 | 11/1976 | Santo . |
| 4,033,424 | 7/1977 | Evans . |
| 4,074,785 | 2/1978 | Masevice ................ 180/68.5 |
| 4,129,194 | 12/1978 | Hammond et al. ........... 105/51 X |
| 4,275,131 | 6/1981 | Richards ................ 429/99 X |
| 4,401,730 | 8/1983 | Szymborski et al. . |
| 4,429,761 | 2/1984 | Haddock, Jr. et al. ....... 180/68.5 X |
| 4,477,542 | 10/1984 | Braswell . |
| 4,582,767 | 4/1986 | Morioka et al. . |
| 4,928,227 | 5/1990 | Burba et al. ............. 180/65.3 X |
| 4,957,829 | 9/1990 | Holl . |
| 5,015,545 | 5/1991 | Brooks ................... 180/68.5 X |
| 5,140,744 | 8/1992 | Miller . |
| 5,304,434 | 4/1994 | Stone ................... 429/100 X |

FOREIGN PATENT DOCUMENTS 629425  11/1927  France ................... 429/99

*Primary Examiner*—Brian L. Johnson
*Attorney, Agent, or Firm*—Leydig, Voit & Mayer, Ltd.

[57] ABSTRACT

A sealed, lead-acid cell tray assembly for powering a vehicle characterized by the ability to provide vastly superior cycle life under regimes requiring relatively deep depths of discharge comprises a tray base, upstanding tray side walls connected to the base, the base and the side walls being dimensionally configured to provide a cell enclosure area having the ability to accept at least six sealed lead-acid cells in a horizontal position, cell-receiving members positioned above the base and attached to the upstanding side walls which divide at least part of the cell enclosure area into cell compartments capable of accepting at least one sealed lead-acid cell in a horizontal position and tray covers which limit access to the cells.

16 Claims, 4 Drawing Sheets

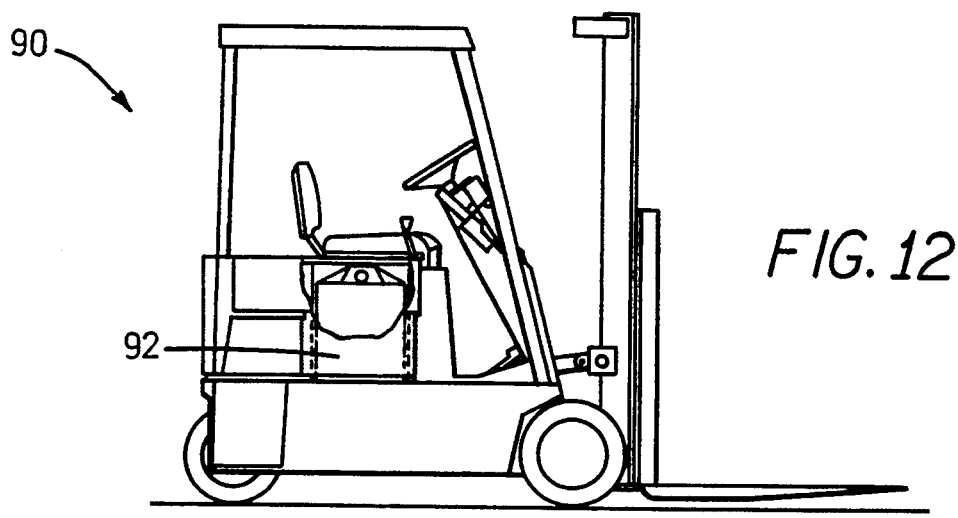
FIG. 12
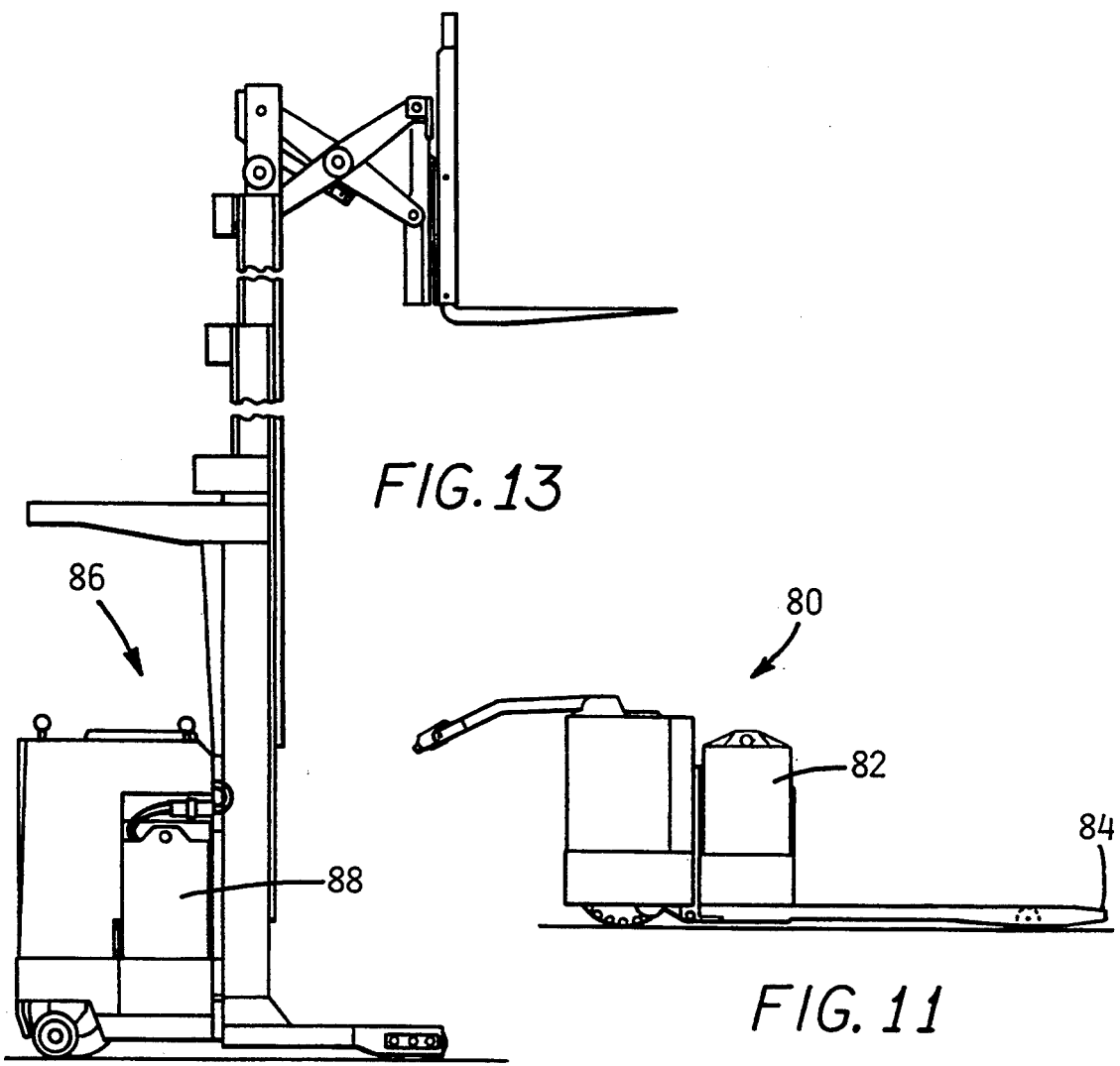
FIG. 13
FIG. 11

SEALED LEAD-ACID CELL TRAY ASSEMBLY AND MOTIVE POWERED VEHICLE USING SUCH CELL TRAY ASSEMBLY

This is a continuation of application Ser. No. 08/041,687 filed on Apr. 1, 1993, now abandoned.

BACKGROUND OF THE INVENTION

1. Field of the Invention

This invention relates to lead-acid cells and batteries and, more particularly, to a cell tray assembly for sealed, maintenance-free, lead-acid cells used in motive power applications.

2. Description of the Prior Art

The advantages that are provided by sealed lead-acid cells and batteries in comparison to conventional, flooded lead-acid batteries are substantial and varied. Sealed lead-acid technology thus offers substantial benefits by eliminating maintenance (e.g., cell watering), expense (e.g., acid purchases), environmental (e.g., expensive waste treatment systems and air-borne acid mist) and safety (e.g., acid burns) concerns.

It is thus not surprising that sealed lead-acid cells and batteries are widely used in commerce today for various applications that have widely differing requirements. In stationary battery applications, the sealed lead-acid batteries provide stand-by power in the event of a power failure. For this type of application, such stationary batteries are maintained at a full state-of-charge and in a ready-to-use condition, typically by floating at a constant preset voltage. Stationary batteries are used for stand-by or operational power in a wide variety of applications, including, by way of illustration, telecommunications, utilities, for emergency lighting in commercial buildings, as stand-by power for cable television systems, and in uninterruptible power supplies.

Uninterruptible power supplies are systems that back-up computers and communications networks. Sealed lead-acid batteries may comprise the power source. The uninterruptible power source allows for the orderly shut-down of computers when there is a sudden interruption in the primary cycle source, such as during a power outage, and provides back-up power for communications networks. The uninterruptible power supply also will accommodate short, or intermittent, losses in power. When there is a power interruption, the batteries in the uninterruptible power system can be subject to rapid discharge.

Numerous stationary power applications require anywhere from 6 to 120 cells or even more. Accordingly, floor space, and sometimes even the height, required for the batteries can present problems. To attempt to minimize the floor space required, it is conventional to position the batteries in various kinds of racks or cabinets. Typically, the battery cabinets that are now being used position the batteries only in a vertical orientation. However, to lessen the floor space required and to accommodate specific applications, sealed lead-acid batteries have been oriented in horizontal positions, as well. Some modular battery stacks and cabinets now available provide a configuration in which the batteries are positioned in the trays in a horizontal position.

Another potential application for sealed lead-acid cells and batteries is a variety of motive power applications in which an array of cells or batteries provides the motive power for vehicles ranging from Class 1 to Class 3 trucks, various automated guided vehicles, mining vehicles and also railroad locomotives.

A variety of design circumstances for motive power applications serves to complicate the situation. Thus, on the one hand, in Class 1 and 2 trucks, i.e., electric rider trucks and electric narrow aisle trucks, respectively, the array of cells or batteries utilized have weight limits that must be met so as to provide the necessary counterbalance for the vehicle. On the other hand, less weight is preferred for Class 3 electric hand trucks since less energy is involved, as long as the appropriate motive power requirements are met.

Also, the physical space available for the motive power source in Class 1 and 2 trucks is often limited. Indeed, the space for the motive power source is often confined so that a maximum space is defined. Still further, in the case of the Class 3 electric hand trucks (often termed "pallet jacks"), there is a height limitation requirement. Accordingly, for safety and practical operational reasons, it is very highly desirable that the operator of the pallet jack be able to see the end of the truck forks. This requirement thus dictates a practical upper limit for the height of the motive power source since the power source is almost always positioned between the operator and the forks.

The performance requirements for motive-powered vehicles are quite different from the performance requirements for stationary battery power sources. In stationary applications, the depth of discharge in service is relatively shallow, and the number of discharges is small, as most batteries are in float service. In direct contrast, motive power applications require relatively deep depths of discharge to be achieved on a continuous cycling basis over a period of time. Indeed, a common requirement for Class 1-3 trucks is that, in an 8-hour shift, the cell or battery assembly must be capable of delivering an 80% depth of discharge and that performance is required for about 300 cycles per year with a useful service life under those conditions of 4 or 5 years.

Using sealed lead-acid cells and batteries in motive power applications would offer substantial advantages over the use of flooded lead-acid batteries. Sealed lead-acid cells and batteries thus allow opportunity charging (i.e., charging for short periods of time when the vehicle is not in service) while such charging could not be satisfactorily used with flooded lead-acid batteries. Sealed lead-acid cells and batteries typically offer a more durable product, due to less shedding of active material and for other reasons. Sealed lead-acid cells and batteries offer improved performance for cold storage applications and the like in comparison to that of flooded lead-acid batteries. Cell watering, periodically needed in the maintenance of flooded lead-acid batteries, is difficult to carry out in some applications because the battery is relatively inaccessible. Indeed, the overall expenses for maintaining flooded lead-acid batteries for their useful service life can be substantial.

Yet, despite the many advantages that would be derived by using sealed lead-acid cells in comparison to other lead-acid battery types, sealed lead-acid cells have only made slight penetration into this market because of the inability to match the performance characteristics of conventional, flooded batteries for such motive power applications. Lead-acid cells and batteries in which the electrolyte is present in gelled form are also promoted for this type of application, but this type of battery likewise has made little penetration due to unsatisfactory performance.

There accordingly exists a need to provide an assembly of sealed lead-acid cells that retains the advantages of using that type of lead-acid cell, yet which can satisfy the performance requirements of motive power applications.

It is accordingly a principal object of the present invention to provide a sealed lead-acid cell tray assembly that provides superior performance for powering a vehicle requiring relatively deep depths of discharge on a repetitive cycling regime.

It is a further object of this invention to provide a sealed lead-acid cell tray assembly which allows ease in manufacture, assembly and installation as well as adaptability to a wide variety of motive power applications. A more specific object provides a cell tray assembly that may be utilized in spark-proof and explosion-proof designs.

A further object lies in the provision of a sealed lead-acid cell tray assembly which allows, when desired, the ability to maximize the motive power performance from given space requirements in comparison to other sealed lead-acid configurations.

Yet another object of the present invention provides a cell tray assembly which facilitates the dissipation of the heat generated during service.

Another object of the present invention is to provide a cell tray assembly that may be used in existing motive power applications without the need to modify the area allotted for the motive power source, i.e., the cell tray assembly of this invention may be used interchangeably with existing motive power sources.

A still further object of this invention provides a sealed lead-acid tray assembly which minimizes the opportunity for accidental shorting and the like.

These and other objects and advantages of the present invention will be apparent from the following description and drawings.

SUMMARY OF THE INVENTION

In its broadest aspects, the present invention provides a sealed lead-acid cell tray assembly for powering a vehicle characterized by the ability to provide a vastly superior cycle life under regimes requiring relatively deep depths of discharge. The tray assembly comprises a tray base and upstanding tray side walls that are connected to the base. The base and the side walls are dimensionally configured to provide a cell enclosure area having the ability to accept at least six sealed lead-acid cells in a horizontal position. The tray assembly is provided with cell-receiving members that are positioned above the base and are attached to the upstanding side walls. These cell-receiving members divide at least part of the cell enclosure area into cell compartments, each of which is capable of accepting at least one sealed lead-acid cell in a horizontal position.

In its preferred embodiment, tray covers are provided so as to limit access to the cells for safety and other reasons. The tray assembly is desirably made of a heat conductive material such as steel so as to facilitate heat dissipation resulting from use. In this latter connection, the tray covers are desirably provided with vent holes; and, in certain of the preferred embodiments, vent means are provided within the tray assembly itself.

The tray assembly of the present invention also provides the ability to include a charger so as to facilitate charging operations. Further, in the preferred embodiments, the tray assembly includes restraints so that the sealed lead-acid cells are adequately held against undesired movement.

Positioning the sealed lead-acid cells in a horizontal position has been found to achieve greatly enhanced cycle life under a cycling regime requiring relatively deep depths of discharge. Indeed, in comparison to other configurations previously used for sealed lead-acid cells, the cycle life performance using the cell tray assembly of the present invention is remarkable. Under rigorous deep cycling regimes such as are required for satisfactory motive power applications for Class 1–3 trucks, the present invention is capable of offering cycle life improvements of from 500% or perhaps even more of the cycle life capable of being achieved with prior sealed lead-acid configurations.

BRIEF DESCRIPTION OF THE DRAWINGS

FIG. 11 is a perspective view of a Class 3 electric hand truck and showing one embodiment of the tray assembly of the present invention in position;

FIG. 12 is a perspective view of a Class 2 electric narrow aisle truck and showing one embodiment of the tray assembly of the present invention in position to power the truck; and FIG. 13 is a perspective view of a Class 1 electric rider truck, partially broken away to show the position of the sealed lead-acid tray assembly of the present invention.

Other than to differentiate the cables for connection to the vehicles in the embodiments of FIGS. 7–10, the components of the tray assembly of the present invention in the various embodiments are identified in those various embodiments with the same numerals.

DETAILED DESCRIPTION OF THE INVENTION

Figure 1:
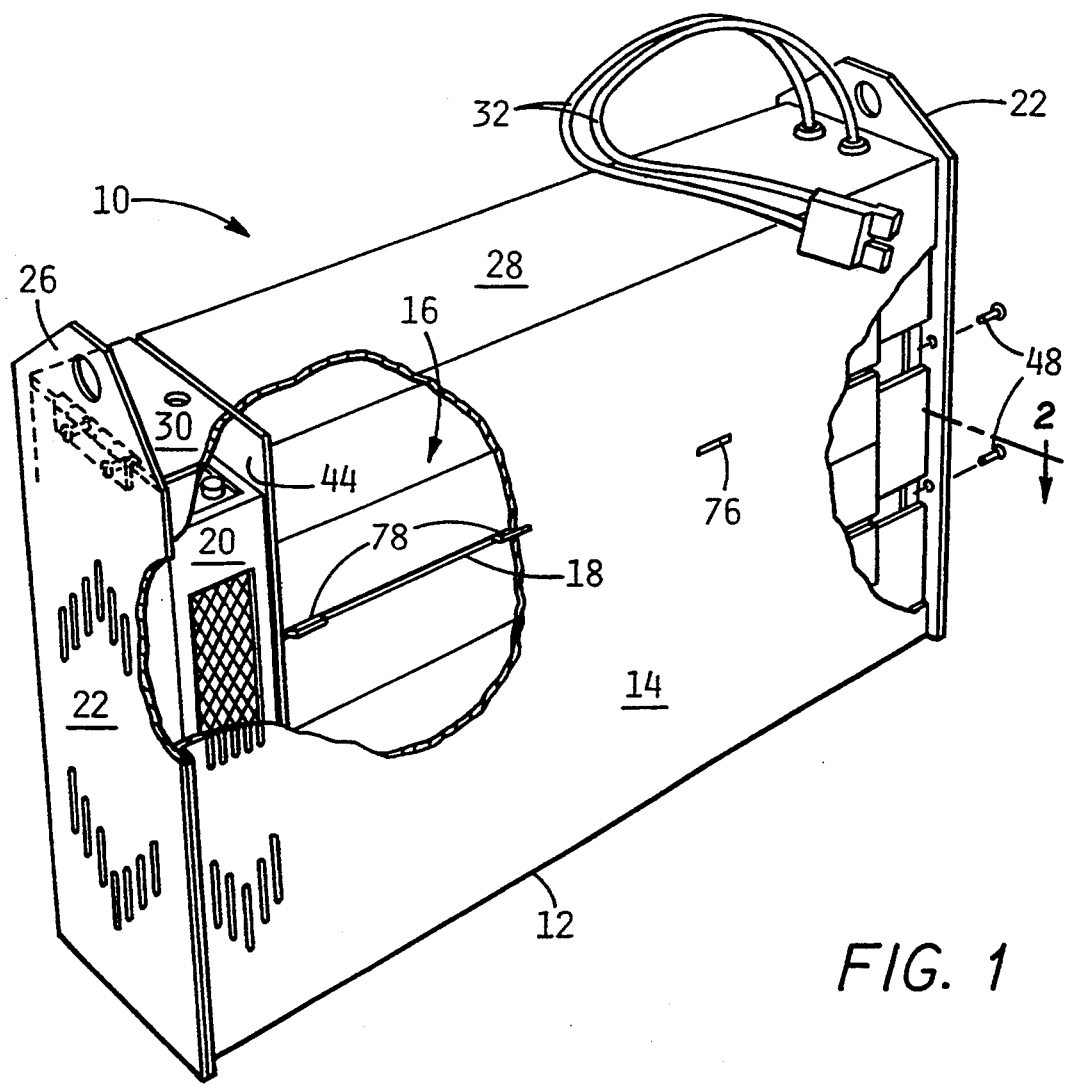
FIG. 1 is a perspective view of a sealed lead-acid tray assembly of the present invention, partially broken away to show the positioning of the cells in the assembly and that of an optional charger.

FIG. 1 shows one embodiment of the sealed lead-acid cell tray assembly of the present invention (shown generally at 10) which comprises a tray base 12, upstanding side walls 14 connected to the tray base and defining a cell enclosure area 16 which can accept at least six cells positioned horizontally as will be more fully described. To separate the tray assembly into compartments, for reasons which will be described more fully herein, cell-receiving members 18 are positioned above the tray base 12 and attached to the upstanding side walls 14 to divide at least part of the cell enclosure area 16 into cell compartments each capable of accepting at least one sealed lead-acid cell in the horizontal position. The cell-receiving members 16 also function to impart rigidity and durability to the cell tray assembly.

Pursuant to an important aspect of the present invention, positioning the sealed lead-acid cells in a horizontal position has been found to provide remarkably enhanced performance under the deep discharge cycling regimes that are required for motive power applications. This enhancement in performance is particularly evident in a sealed lead-acid cell using the hybrid alloy configuration as described in U.S. Pat. No. 4,401,730 to Szymborski et al. More particularly, it is expected that use of the present invention in Class 1-3 trucks should allow performance essentially equivalent to that obtained with flooded lead-acid batteries, i.e., the ability to permit discharge to an 80% level during an 8-hour shift for up to 300 such cycles per year for 4 years or so. However, regardless of the specific sealed lead-acid design, positioning the cells in a horizontal position will provide enhanced performance under deep discharge cycle regimes.

In the embodiment of FIG. 1 and pursuant to an optional feature, the tray assembly is dimensionally configured to allow space for a conventional charger 20. Suitable chargers are well known in the art and will allow recharging by simply plugging into any 15-amp, 120-volt AC outlet.

The embodiment of FIG. 1 will generally be used for applications such as pallet jacks. In other applications, the size of the required charging equipment makes inclusion in the cell tray assembly usually impractical.

According to a preferred embodiment of the present invention, the cell tray assembly 10 is provided with tray covers 22 attached to upstanding side walls 14. Such tray covers 22 limit access to the sealed lead-acid cells 24 and also add rigidity and strength to the cell tray assembly.

An optional feature of the present invention is provided by lifting ears shown generally at 26, and illustrated as being a part of tray covers 22. This lifting aid allows the cell tray assembly to be more readily moved and placed in position, a feature often desired because the weight of the assembly can range from 460 pounds (e.g., for a 12-volt configuration) to about 1175 pounds or even more (e.g., for a 24-volt configuration). Thirty-six (or more) volt configurations can be even heavier.

The particular shape of the lifting aid, when used, can be varied as desired. Also, while shown as being an integral part of the tray cover, the lifting aid may be separate, or may be part of, or attached to, any other part of the cell tray assembly. Forming the lifting aid as a part of the tray cover simplifies assembly and allows optimization of material costs, i.e., only the tray covers need be strong enough to carry the entire weight of the assembly while the rest of the cell tray assembly components need less strength.

The more preferred embodiment also includes tray assembly top 28 to provide rigidity and durability. When the cell tray assembly includes a charger 20, access is provided by hinged cover 30. Cables 32 are provided for connecting the positive and negative termination of the cell configuration to the vehicle when placed in service. Suitable cables are well known and may be used.

Figure 2:
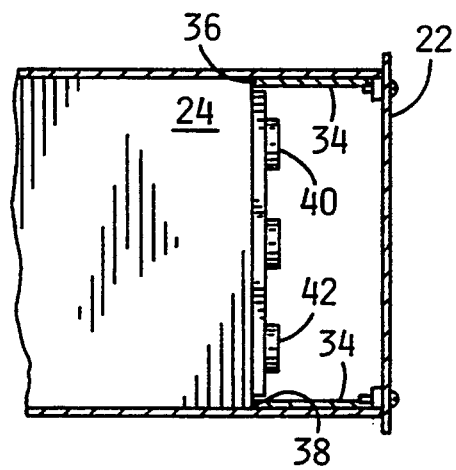
FIG. 2 is a cross-sectional view taken generally along line 2—2 of FIG. 1 and illustrating the positioning of the tray cover in relation to the cells and the manner in which these cells are restrained from undesired movement.

Pursuant to a further aspect of the present invention, the tray assembly preferably includes restraints for holding the sealed lead-acid cells in the proper position (i.e., preventing movement out of the cell compartments). To this end, and as is shown in FIG. 2, the tray cover 22 includes restraint members 34. The inside end 36 of each restraint member 34 is dimensioned to abut the shoulder 38 of the sealed lead-acid cell 24 when cell 24 is in its proper position in the tray assembly.

As may be seen from FIGS. 1 and 2, cell-receiving members 18 and tray covers 22 are dimensioned to eliminate any possibility of contact of the positive and negative terminals 40 and 42 of the sealed lead-acid cells 24 with either the cell-receiving members 18 or the tray cover 22. Cell-receiving members 18 are thus dimensioned to terminate short of the end of the cells 24 (FIG. 1) by about one inch or so. Tray cover 22 (FIG. 2) is dimensioned to provide a space of one inch from the end of the cells 24. If desired, and as shown in FIG. 2, the tray cover 22 may be dimensioned to provide a larger space than required for safety reasons, if desired to, for example, provide outside dimensions for the tray assembly that better fit the space available in a particular application.

In general, it is preferred that each tray cover 22 include a pair of restraint members 34 so that the cells will be firmly held in position against horizontal movement in the tray compartments. However, as may be appreciated, the restraint function on one end of the cells becomes unnecessary when the tray assembly is configured to allow space for a charger. In such an embodiment, the tray assembly is dimensioned to allow space for the charger in a force-fit type of relationship; and, as shown in FIG. 1, a spacer plate 44 separates the cell enclosure area 16 from the charger. Spacer plate 44 thus holds one end of the cells 24 in position. The spacer plate 44 may itself be held in position by any means desirable, such as by welding to the tray base 12 and side walls 14.

The tray cover shown in FIG. 2 is a particularly desirable means of satisfying the restraint function since that restraint function is built into the cover so that only a single component is required. However, as may be appreciated, and as will be shown in one other embodiment, the restraint function could be accomplished by a separate component; or, indeed, the restraint function can be satisfied by any other means desired so long as the cells are held in the appropriate position.

Figures 3, 4, 5:
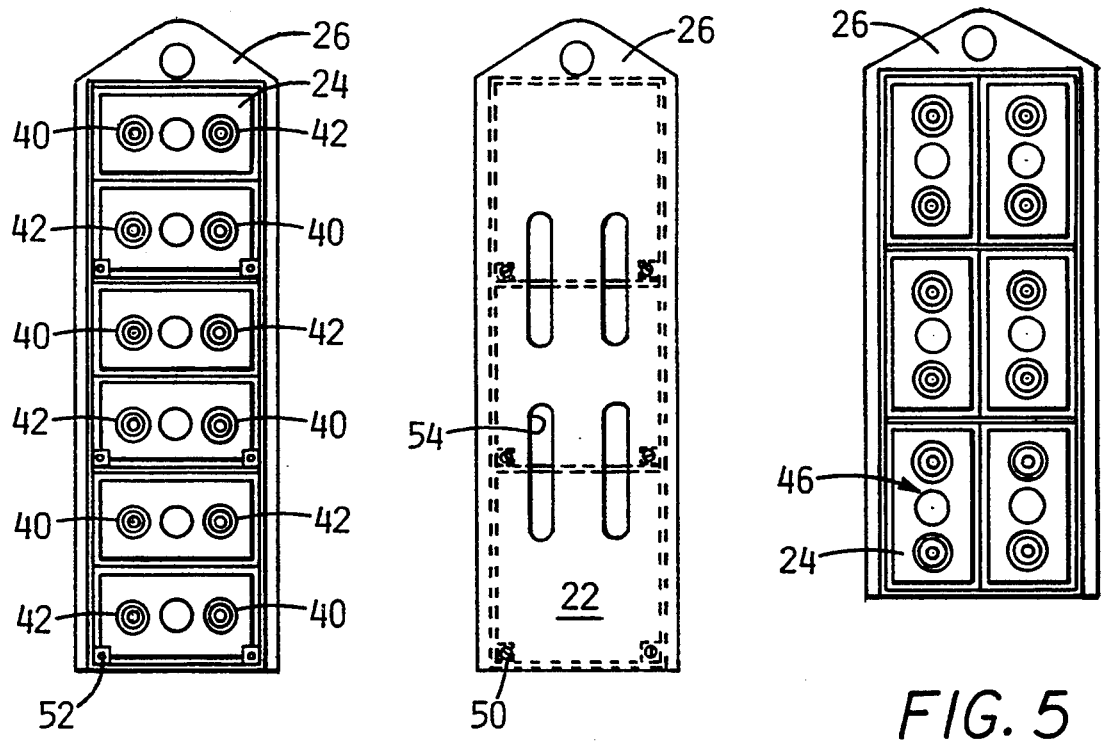
FIG. 3 is a front elevation view of the tray assembly of FIG. 1 with the tray cover removed and further showing the positioning of the cells in the tray assembly.
FIG. 4 is a front elevation view of the tray cover.
FIG. 5 is a front elevation view of another embodiment of the tray assembly of this invention with the tray cover removed and showing two cells in each compartment in a side-by-side configuration.

FIG. 3 shows more particularly the positioning of the cell-receiving members dividing the cell enclosure area into multi-story, cell compartments. Thus, as shown, cell-receiving members 18 divide the cell enclosure area, shown generally by arrow 16, into cell compartments 46. In the illustrative embodiment shown, each cell compartment 46 is dimensionally configured to accept two sealed lead-acid cells 24. In this embodiment, the cells 24 are positioned such that the internal plates are parallel to the tray base 12.

It is preferred to use sealed lead-acid cells made in accordance with the aforementioned Szymborski et al. '730 patent. Cells of this type are commercially available. However, any other sealed lead-acid cells may be used in the present invention.

The cells 24 are positioned within the tray assembly as desired to provide the requisite voltage. Most typically, the six cell embodiment shown will be positioned so as to provide a 12-volt motive power source, by alternating the position of the positive and negative terminals of adjacent cells, 40 and 42 respectively, as shown in FIG. 3. Since sealed lead-acid cells may be used in any attitude or position, the cells may be positioned as needed to provide the desired voltage for the intended application.

The electrical connections between adjacent cells can be made using any desired connectors suitable for this purpose. Many suitable connectors are known. The use of epoxy-coated bolts and copper connectors are known and have been used. Burned-on connectors, as are employed with flooded lead-acid batteries, may also be used, if desired.

The cell compartments 46 should be sized so as to accommodate no more than two cells. Indeed, in accordance with one aspect of the present invention, when cells having relatively high capacities are used, it is preferred to size the cell compartments to accommodate just a single cell. In such a configuration, each sealed lead-acid cell is essentially surrounded in a steel or other heat conductive material so that the dissipation of heat generated in service is facilitated; and proper compression is provided.

More particularly, stacking more than two cells on top of each other in the configuration shown in FIG. 3 could well cause problems in service. Thus, for example, with stacks of three or more cells in a given compartment, the bottom cell could well perform far differently from the top-positioned cell because of the weight of the stack. Such differences in performance could also adversely affect the useful service life.

For sealed lead-acid cells to perform properly, appropriate compression between the plates and separators must be maintained. Since thin wall polypropylene jars are commonly used in sealed lead-acid cells and such thin wall jars tend to expand in service, the appropriate compression is maintained in the cell tray assembly of the present invention by suitably sizing the cell compartments in relation to the cell dimensions and by the weight of the cell when the cell compartment is sized to hold two cells.

Oversizing the cell compartments (or stacking three or more cells in a single compartment) would result in under-compression for at least some of the cells (e.g., the top-positioned cell in the stack). Such under-compression results in a loss of contact between the plates and separators and less than expected capacity.

On the other hand, under-sizing the cell compartment (or stacking three or more cells in a single compartment) would result in over-compression for at least some of the cells (e.g., the bottom-positioned cell in the stack). Over-compression causes an imbalance between the electrolyte in the separators and plates, and possibly even free electrolyte squeezed out of the separators. While perhaps initially providing better capacity, inferior performance and a shorter service life will ultimately result.

It has been found that proper compression is provided by dimensioning the cell compartments just slightly larger than the cell(s) dimension so that the cells may be moved without undue difficulty into the position desired in the cell tray assembly. Dimensioning the height of the cell compartment to be about 0.030 inch or so greater than the height of the cell(s) when in position has been found suitable to allow ease in assembly while providing proper compression in service. Distances greater or less than 0.030 inch can, of course, be used. Ideally the cell compartment would be sized the same as the cell(s) height in position. Whether proper compression is provided can be determined by the performance in service.

Pursuant to one aspect of the preferred embodiment, access to the cells is limited. This is achieved (as shown in FIGS. 1, 3 and 4) by bolting the tray cover 22 to the side walls 14 with bolts 48 via holes 50 in the tray covers 22 that line up with weld nuts 52 in the side walls 14. Other means of attaching the tray cover to the side walls may be utilized as desired.

While attaching the cover by bolts or the like to the upstanding side walls 14 is designed to minimize access, one aspect of the preferred embodiment of this invention provides openings 54 designed to provide venting for heat dissipation purposes, release of any gas expelled from the cells 24, and allow access to the cell terminals without removal of the cover while the cells are positioned in the tray assembly.

If desired, the tray covers 22 may be over-sized in comparison to the area defined by the tray base, side walls and top. In this fashion, the cell tray assembly 10 can be sized to provide a better fit in the vehicle space designed for the power source.

Motive power applications are generally characterized by a defined space for the motive power source, and the space limitations vary considerably from one application to another. Accordingly, pursuant to yet another aspect of the present invention, the cell tray assembly may be configured for space requirements with narrow footprints. To this end, FIG. 5 shows an embodiment in which the cell tray assembly is identical to that shown in the embodiment of FIGS. 1–4, except that the cells 24 are positioned in the cell compartments 46 on their side. In this position, the individual plates of the sealed lead-acid cells 24 are generally perpendicular to the tray base 12. This embodiment retains the considerable advantages attained by positioning the cells horizontally, so as to accommodate differing space requirements, and allows two-cell compartments without stacking.

In the FIG. 5 embodiment, proper compression is obtained by suitably sizing the width of the cell compartments 46. Thus, when in service, cell expansion is in a side-to-side direction, rather than a top-to-bottom (or bottom-to-top) direction as in the embodiment of FIG. 1. As was the case with the FIG. 1 embodiment, the width of the cell compartment 46 will provide proper compression when sized to be about 0.030 inch or so greater than the width of the cells.

Figure 6:
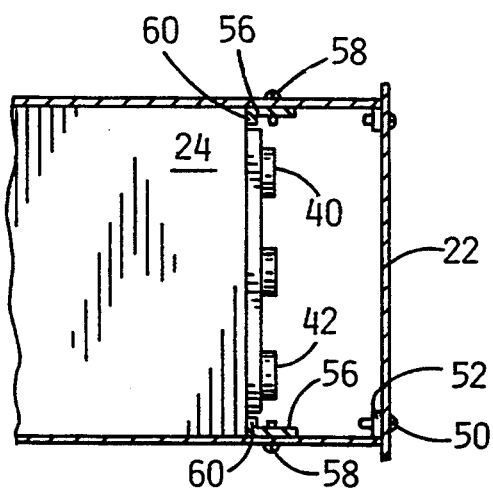
FIG. 6 is a cross-sectional view similar to FIG. 2 and illustrating another restraint system which may be used to restrain the cells in the desired position.

As an alternative to providing the tray cover with a built-in restraint function as has been described herein, a separate component may be provided for this purpose. To this end, and as is shown in FIG. 6, restraint bars 56 are provided. Each restraint bar 56 is attached by suitable means to the upstanding side walls by any desirable means, such as by bolts 58. Base member 60 of restraint bar 56 is designed to abut the shoulder 38 of the cell 24 so as to hold the cells in the desired position.

Figure 7:
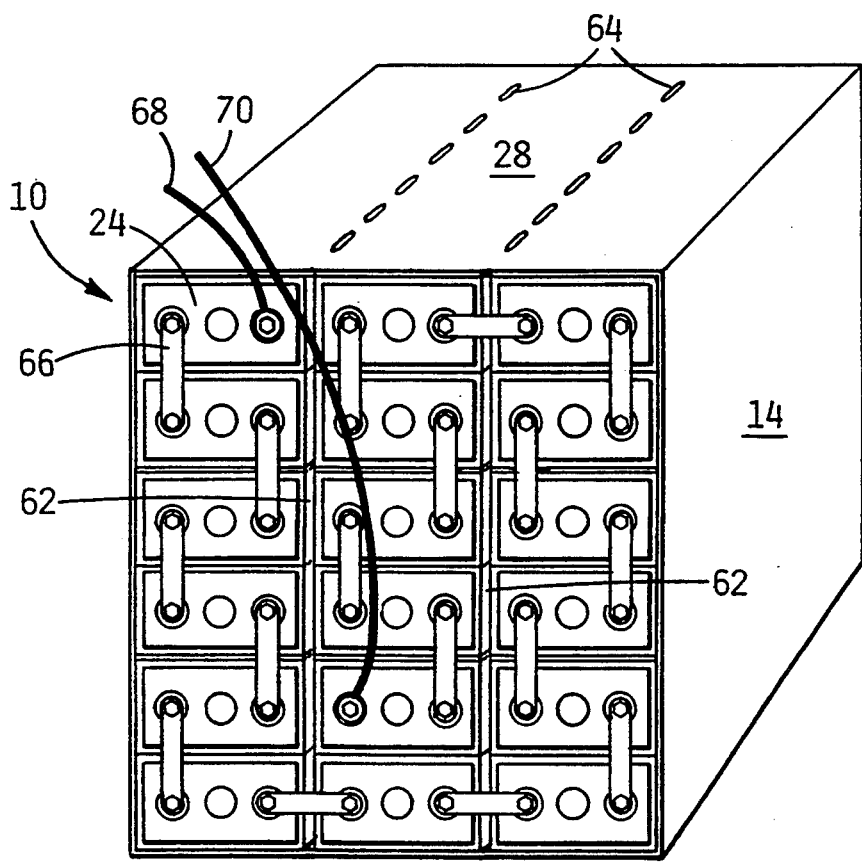
FIG. 7 is a schematic, perspective view of a further alternative embodiment of the tray assembly of the present invention and showing a design suitable for a 36-volt configuration.

Pursuant to still another aspect of the present invention, the tray assembly may be readily designed to provide a suitable power source for a variety of motive power applications which may require up to 36 volts or even more. To this end, FIG. 7 illustrates an alternative embodiment of the tray assembly of the present invention in which a 36-volt motive power source is provided. As can be seen, in this embodiment, the cell tray assembly shown generally at 10 includes 18 sealed lead-acid cells 24 positioned horizontally in three stacks. In this embodiment, each cell stack is separated by an air channel 62 and the top of the tray assembly 28 is optionally provided with venting slots 64. While optional, these venting aids are particularly desirable and are preferred for configurations of this type. In the FIG. 7 embodiment, the positive and negative terminals 40 and 42 are electrically connected by connectors 66. Cables 68 and 70, respectively, connect the positive and negative termination of the cell assembly to the vehicle.

Figure 8:
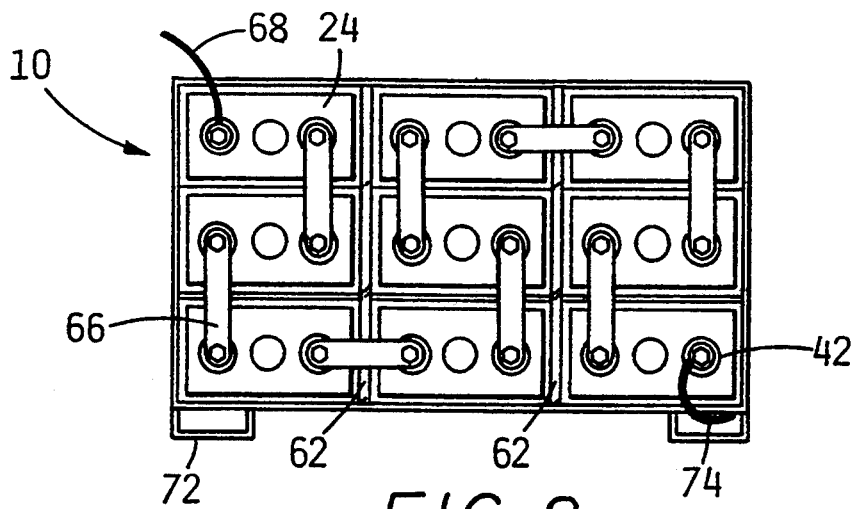
FIG. 8 is a schematic, front elevation view of yet another alternative embodiment of the tray assembly of the present invention and showing a 36-volt, low profile configuration in which the cells are positioned in a back-to-back configuration.
Figure 9:
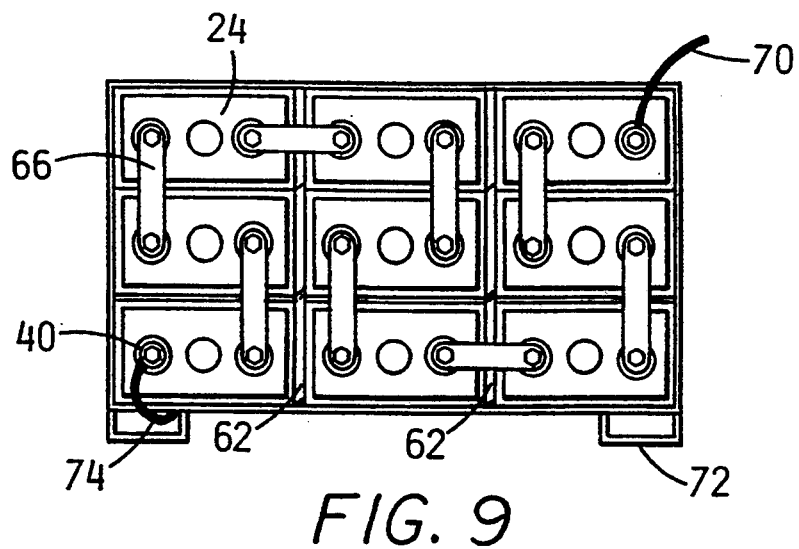
FIG. 9 is a rear elevation view of the tray assembly embodiment of FIG. 8 and further showing the electrical connections between the cells.
Figure 10:
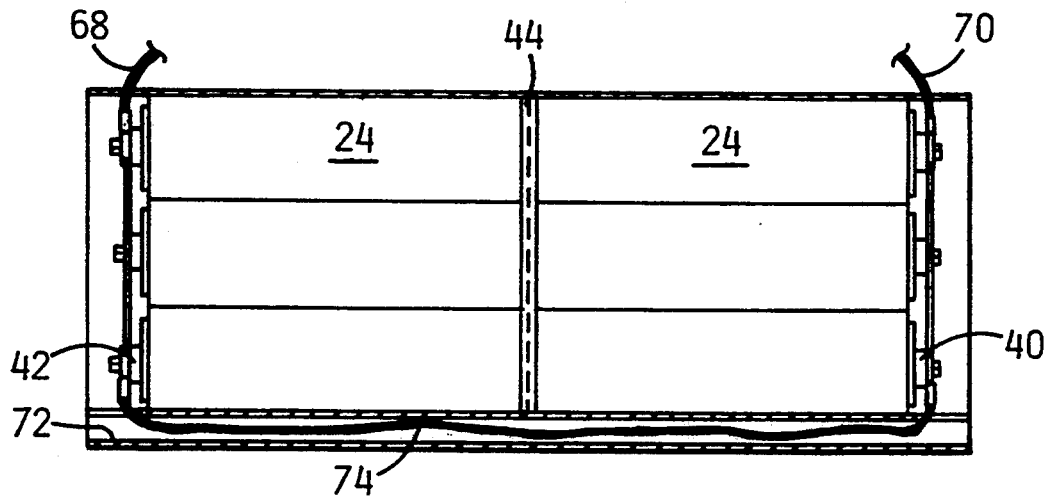
FIG. 10 is a side elevation view with the side wall of the tray cover assembly removed so as to further show the cell-to-cell connections for the embodiment of FIG. 8.

Another aspect of the present invention provides a sealed lead-acid cell tray assembly in which the cells are positioned in a back-to-back location in the tray assembly. To this end, and as is shown in FIGS. 8-10, a tray assembly is provided in which individual cells 24 are positioned in a back-to-back configuration (as best seen in FIG. 10) in the tray assembly shown generally at 10. Spacer plate 44 serves to restrain one end of the cells 24 from undesired movement. FIG. 8 shows the front of the tray assembly 10 in which the individual cells are connected with connectors 66. In this embodiment, the positive termination of the cell assembly is electrically connected to the vehicle to be powered via cable 68. As in the embodiment of FIG. 7, air channels 62 are provided to separate the individual cell stacks.

According to one aspect of the present invention, the tray assembly of this embodiment is provided with a means to facilitate the connection of the forwardly-positioned cells to the rearwardly-positioned cells. Thus, channels 72 are attached to the tray base 12 and are dimensioned to accept cable 74 which connects the negative terminal 42 in the front cell 24 with the positive terminal 40 in rearwardly positioned cell 24. As can be seen in FIG. 9, the negative termination is then connected via cable 70 to the vehicle.

As may be appreciated from the embodiment of FIGS. 8-10, this embodiment minimizes the internal resistance by the connections provided. More particularly, the embodiment shown requires a minimum length of cable to connect the negative terminal in the front set of cells to the positive terminal in the rearwardly positioned set of cells.

Any suitable materials can be used to construct the tray assembly. Because of the weight requirements involved, it is desirable to use, as illustrative examples, hot rolled steel or commercial quality mild rolled steel. As one example, the tray base, side walls, cover and cell-receiving members can be 0.012 inch thick, while the tray covers are 0.019 inch thick. To desirably minimize any corrosion problems in the unlikely event of any leakage or the like, the components may be coated with a liquid epoxy or powdered epoxy material. Suitable epoxy materials are well known and have been used in this field for similar purposes.

Pursuant to yet another aspect of the preferred embodiment of the present invention, the cell tray assembly utilizes a minimum number of components, designed in a way to facilitate assembly. To this end, it is preferred to manufacture the cell tray base 12, side walls 14, tray top 28 and cover 22 from flat steel or other material, stamped and bent to provide two L-shaped members that may be welded or otherwise attached together. When the embodiment utilizes a drop-in charger, one L-shaped member can be stamped to provide an opening through which the charger can be inserted after the cell tray assembly has been fully assembled.

It is likewise advantageous to form the L-shaped members with suitably positioned apertures 76 (FIG. 1) to accept complementarily dimensioned ears 78 on cell-receiving members 18. Attachment can be achieved by spot welding, for example, or, indeed, by any other desired technique. In this fashion, the proper positioning of the cell-receiving members 18 is facilitated, insuring that the desired compression for the cells will be achieved.

It should be appreciated that the cell tray assembly of the present invention offers sufficient versatility so that a wide variety of motive power applications may be satisfied. The cell tray assembly may thus be configured to satisfy applications requiring anywhere from 12-volts up to 48-volts, or even up to 72-volts or more.

Likewise, as may be appreciated, the cell tray assembly of this invention can be designed to satisfy explosion-proof (EX) and spark-proof (EE) applications, as those requirements are set forth in Underwriters Laboratories standard UL-583. More particularly, to satisfy the criteria for an EE application, all that is required would be to add a masonite, or other insulation, layer to the inward side of the tray cover, as well as an expanded metal mesh over the tray cover vent openings to keep foreign objects out, and perhaps a locking device on the tray cover. To satisfy the design intention for an EX application, all that is required is a fuse box (i.e., switch) that can disconnect the cables when the tray cover is removed.

The present invention may be used as the power source for any motive-powered vehicle. Illustrative examples include automobiles, vans and the like. Class 1-3 trucks embody particularly useful applications for the present invention. FIG. 11 shows an illustrative pallet jack shown generally at 80 with one embodiment of the tray assembly 10 of the present invention in position as is shown at 82. While seemingly unlimited as to the height dimension, it is generally required, or at least found highly desirable, for this type of application to take the height into consideration. More particularly, it will be generally useful to insure that the height of the battery will not prevent the operator of the truck 80 from seeing the end of the forks 84.

FIG. 12 shows a Class 2 narrow aisle truck. The illustrative truck shown generally at 86 thus includes the tray assembly 10 in position, as is shown generally at 88. As can be seen, in this type of application, space limitations are present both as to height and the footprint.

FIG. 13 shows the use of the present invention with an illustrative Class 1 rider truck. The tray assembly in the truck shown generally at 90 is positioned in the compartment shown generally at 92. Again, as is typical of this application, there are space limitations for the motive power source.

The present invention thus provides a sealed lead-acid tray assembly that can satisfy the deep discharge cycling requirements of motive power applications. It is believed that the enhanced cycle life provided will allow sealed lead-acid batteries to at least meet the performance benefits now achieved using conventional, flooded lead-acid batteries in motive power applications. The enhanced performance obtained using the present invention is truly remarkable.

I claim:

1. A sealed lead-acid cell tray assembly mounted on a motive powered vehicle which comprises a tray base, upstanding tray side walls connected to said base, said base and said side walls dimensionally configured to provide a cell enclosure area having a means for accepting at least six sealed lead-acid cells in a horizontal position, said means for accepting including cell-receiving members positioned above said tray base and attached to said upstanding side walls, said cell-receiving members dividing at least part of said cell enclosure area into cell compartments each capable of accepting at least one sealed lead-acid cell in the horizontal position, a sealed lead-acid cell having a positive and negative terminal and horizontally positioned in each cell compartment and electrically connected together, and electrical connectors connecting the cells to the vehicle.

2. The cell assembly of claim 1 which includes tray covers, said tray covers being attached to said upstanding side walls and said tray base.

3. The cell assembly of claim 2 wherein said tray covers have vent openings to facilitate heat dissipation and said vent openings are positioned and configured to allow access to the positive and negative terminals of the cells positioned in the assembly.

4. The cell assembly of claim 1 wherein each cell compartment is dimensioned to accept two sealed lead-acid cells.

5. The tray assembly of claim 2 which includes a restraint abutting a cell and attached to either said tray covers or said upstanding tray side walls, said restraint holding the cell positioned in said cell compartment in the cell compartment and preventing movement.

6. The tray assembly of claim 5 wherein said tray covers have an integral restraint member which abuts the cell when said cells are in position and the tray covers are attached.

7. The tray assembly of claim 1 wherein the cell enclosure area is dimensioned to provide an area for a charger for said cells and a charger for sealed lead-acid cells is positioned in said area and abuts one end of the cells.

8. The tray assembly of claim 1 which includes a tray top connected to said side walls.

9. The tray assembly of claim 1 wherein said side walls have apertures in a predetermined position to provide a desired cell compartment size and said cell-receiving members include ears complementally shaped with respect to the side wall apertures.

10. The tray assembly of claim 1 wherein said cell compartments are dimensioned to accept two cells in a stacked position.

11. The tray assembly of claim 1 wherein said cell compartments are dimensioned to accept two cells positioned side-by-side in said cell compartment.

12. The tray assembly of claim 1 wherein said cell compartments are dimensioned to accept one cell.

13. A motive-powered vehicle which comprises a vehicle having a cell receptacle area and connectors for accepting the positive and negative termination from a sealed lead-acid cell assembly, a sealed lead-acid tray assembly dimensionally sized to fit into the cell receptacle area, said tray assembly comprising a tray base, upstanding tray side walls connected to said base, said base and said side walls dimensionally configured to provide a cell enclosure area having means for accepting a sufficient number of sealed lead-acid cells in a horizontal position to power the vehicle, said means for accepting including cell-receiving members positioned above said base and attached to said upstanding side walls, said cell-receiving members dividing at least part of said cell enclosure area into cell compartments each capable of accepting at least one sealed lead-acid cell in the horizontal position, a sealed lead-acid cell having a positive and negative terminal horizontally positioned in each cell compartment and electrically connected together to provide the sealed lead-acid cell assembly having positive and negative termination for the cell assembly, and electrical connectors connecting the positive and negative termination of the cell assembly to the vehicle connectors.

14. The motive powered vehicle of claim 13 wherein said vehicle is a hand truck.

15. The motive powered vehicle of claim 13 wherein said vehicle is a narrow aisle truck.

16. The motive powered vehicle of claim 13 wherein said vehicle is a rider truck.

* * * * *